(12) United States Patent
Kuromaru et al.

(10) Patent No.: US 6,671,708 B1
(45) Date of Patent: Dec. 30, 2003

(54) PROCESSOR AND IMAGE PROCESSING DEVICE

(75) Inventors: Shunichi Kuromaru, Fukuoka (JP);
Mana Hamada, Fukuoka (JP);
Tomonori Yonezawa, Fukuoka (JP);
Masatoshi Matsuo, Fukuoka (JP);
Tsuyoshi Nakamura, Fukuoka (JP);
Masahiro Oohashi, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/600,247

(22) PCT Filed: Nov. 25, 1999

(86) PCT No.: PCT/JP99/06591
§ 371 (c)(1),
(2), (4) Date: Aug. 31, 2000

(87) PCT Pub. No.: WO00/31658
PCT Pub. Date: Jun. 2, 2000

(30) Foreign Application Priority Data

Nov. 26, 1998 (JP) ............................................. 10-335443

(51) Int. Cl.[7] .............................. G06F 7/38; G06F 7/32
(52) U.S. Cl. ....................................... 708/490; 708/521
(58) Field of Search ................................. 708/490, 524, 708/521, 620; 712/36, 233–236

(56) References Cited

U.S. PATENT DOCUMENTS 5,299,320 A    3/1994   Aono et al.
5,594,679 A    1/1997   Iwata
5,828,907 A  * 10/1998  Wise et al. .................... 712/36
6,490,607 B1 * 12/2002  Oberman ..................... 708/620

FOREIGN PATENT DOCUMENTS

JP    05-61901    3/1993
WO    94/23384    10/1994

OTHER PUBLICATIONS

Takashi Hashimoto et al., "MPEG4 Codec DSP", technical research report by the Institute of Electronics, Information and Communication Engineers, May 1999, vol. 99, No. 145, pp. 45–50 (including English language abstract).

* cited by examiner

Primary Examiner—Chuong Dinh Ngo
Assistant Examiner—Chat C Do
(74) Attorney, Agent, or Firm—Wenderoth, Lind & Ponack, L.L.P.

(57) ABSTRACT

An image processing apparatus according to the present invention comprises a general arithmetic circuit 101 comprising a program control circuit 103, a first address generator 104, a first data memory 105, a first pipeline operation circuit 106, a second address generator 113, a second data memory 114 and a second pipeline operation circuit 112, and a dedicated arithmetic circuit 102 comprising a control circuit 115, a first dedicated pipeline operation circuit 107, a second dedicated pipeline operation circuit 108, . . . , an N-th dedicated pipeline operation circuit 110, as shown in FIG. 1. The arithmetic unit having the above-described structure, for example, can realize an arithmetic unit which can be applied to various applications. Further, considering the age of IP (Intellectual Property) which will come in the future, the arithmetic unit can exhibit the flexibility toward the applications.

7 Claims, 12 Drawing Sheets

Inverse
quantization

Fig.3 (a) |REC| = QUANT×(2×|LEVEL|+1) : QUANT id odd number
Fig.3 (b) |REC| = QUANT×(2×|LEVEL|+1)−1 : QUANT is even number
Fig.3 (c) |REC| = 0 : REC = 0
Fig.3 (d) REC = sign(LEVEL)×|REC|

→

Fig.3 (e) REC = (2×QUANT)×LEVEL+QUANT : QUANT is odd number and REC is positive number
Fig.3 (f) REC = (2×QUANT)×LEVEL−QUANT : QUANT is odd number and REC is negative number
Fig.3 (g) REC = (2×QUANT)×LEVEL+(QUANT−1) : QUANT is even number and REC is positive number
Fig.3 (h) REC = (2×QUANT)×LEVEL−(QUANT−1) : QUANT is even number and REC is negative number
Fig.3 (i) REC = 0 : REC = 0

| sign of first input | positive | 0 | negative |
|---|---|---|---|
| output from output selector 403 | output from adder 401 | first input | output from subtracter 402 | output = first input + second input : when first input is positive number
output = first input − second input : when first input is negative number
output = 0 : when first input is 0

Fig.12

| Block | Processing content |
|---|---|
| host interface 1112 | output of bitstream, input of command data |
| first DSP core 1101 | ME (Motion Estimation) processing |
| second DSP core 1102 | MC (Motion Compensation) processing, DCT processing, Q (Quantization) processing, IQ (Inverse Quantization) processing, IDCT processing, VLC (Variable Length Coding) processing |
| video interface 1113 | prescaler processing, input of digital image data |

Fig.13

| Block | Processing content |
|---|---|
| host interface 1112 | output of bitstream, input of command data |
| first DSP core 1101 | VLD (Variable Length Decoding) processing, IQ (Inverse Quantization) processing, IDCT processing |
| second DSP core 1102 | post-noise reduction filter |
| video interface 1113 | postscaler processing, output of digital image data |

PROCESSOR AND IMAGE PROCESSING DEVICE

TECHNICAL FIELD

The present invention relates to arithmetic units which perform multimedia signal processing at higher speed, and to an image processing apparatus using the arithmetic unit.

BACKGROUND ART

Prior art program-controlled processors (arithmetic units) mount vector instructions, thereby obtaining higher performance. A prior art arithmetic unit shown in FIG. 14 comprises a program control circuit 1401 which decodes a vector instruction and outputs a first start signal and a second start signal, a first address generator 1402 which outputs a first address in accordance with the first start signal, a first data memory 1403 which outputs first data on the basis of the first address, a pipeline operation circuit 1404 which executes a pipeline operation on the basis of the first data, a second address generator 1405 which outputs a second address in accordance with the second start signal, and a second data memory 1406 which contains a result of the operation by the pipeline operation circuit 1404 on the basis of the second address.

As shown in FIG. 14, in this arithmetic unit, when the vector instruction is decoded by the program control circuit 1401, the first start signal is output by the program control circuit 1401, and the generation of N addresses is started by the first address generator 1402 in accordance with the first start signal. The first data memory 1403 which receives the N addresses supplies N pieces of data to the pipeline operation circuit 1404. The pipeline operation circuit 1404 receives the supplied N pieces of data and executes the pipeline operation processing.

In addition, the program control circuit 1401 outputs the second start signal in a timing when initially processed data are output from the pipeline operation circuit 1404, and the second address generator 1405 outputs N addresses to the second data memory 1406 in accordance with the second start signal. Accordingly, operation results which are output by the pipeline operation circuit 1404 are successively stored in the second data memory 1406.

Then, when the output of the N pieces of data is finished, the first address generator 1402 and the second address generator 1405 output a first end signal and a second end signal to the program control circuit 1401, respectively, thereby terminating the vector instruction.

In the case of applications requiring a very high operation performance such as real time image processing, general pipeline operation circuits sometimes do not have sufficiently high operation performances. In this case, the operation performance is increased by a hybrid structure in which specific high load operations are performed by dedicated pipeline operation circuits (such as a DCT (Discrete Cosine Transform) operation circuit) and other processings are performed by the general arithmetic circuits, thereby ensuring the real time processing. However, the required dedicated pipeline operation circuits vary with the contents to be processed. Therefore, the program control circuit has timing designs which are inherent in respective dedicated pipeline operation circuits. In other words, the timing designs are specific to respective applications. Considering the age of IP (Intellectual Property) which will come in the future, it is a large problem that the program control circuit which is the most complex part in the processor should be changed according to purposes.

The present invention is made in view of this problem, and it provides an arithmetic unit having a structure which is divided into a general arithmetic circuit and a dedicated arithmetic circuit to prevent the change in the dedicated arithmetic circuit for each purpose from affecting the general arithmetic circuit, whereby the unit can be applied to various applications, and image processing apparatus using the arithmetic unit.

DISCLOSURE OF THE INVENTION

An arithmetic unit according to one embodiment the present invention has a general arithmetic circuit and a dedicated arithmetic circuit, the general arithmetic circuit mounts plural vector instructions and executes a pipeline operation on tile basis of the vector instructions together with the dedicated arithmetic circuit. In the arithmetic unit, the general arithmetic circuit outputs: a dedicated pipeline operation circuit selection signal notifying a contest of arithmetic in the dedicated arithmetic circuit; plural operation results of the general arithmetic circuit; and a general arithmetic circuit output data enable signal notifying an output timing of the plural operation results, to the dedicated arithmetic circuit. The general arithmetic circuit receives: plural dedicated operation results of the dedicated arithmetic circuit; and a dedicated arithmetic circuit output data enable signal for recognizing an output timing of the plural dedicated operation results and a termination timing of the output data, from the dedicated arithmetic circuit. The dedicated arithmetic circuit comprises: plural dedicated pipeline operation circuits each outputting a signal notifying a number of pipeline stages and executing a pipeline operation for the plural operation results of the general arithmetic circuit; a data selection circuit for arbitrarily selecting dedicated operation results which are output by one of the plural dedicated pipeline operation circuits, from dedicated operation results which are respectively output by the plural dedicated pipeline operation circuits, in accordance with the dedicated pipeline operation circuit selection signal of the general arithmetic circuit, and outputting the arbitrarily selected dedicated operation results as the plural dedicated operation results to the general arithmetic circuit; and a control circuit for receiving the signals each notifying the number of pipeline stages, each of which signals is output by each of the plural dedicated pipeline operation circuits, and the dedicated pipeline operation circuit selection signal and the general arithmetic circuit output data enable signal of the general arithmetic circuit, and outputting the dedicated arithmetic circuit output data enable signal to the general arithmetic circuit.

According to the above-described structure, the arithmetic unit can mount an arbitrary dedicated pipeline operation circuit which is suitable for each purpose without changing the program control circuit, regardless of the structure of the general arithmetic circuit. Consequently, the arithmetic unit which can be applied to the various applications can be realized.

An arithmetic unit according to another embodiment of the present invention has a general arithmetic circuit and a dedicated arithmetic circuit, the general arithmetic circuit mounts plural vector instructions and executes a pipeline operation on the basis of the vector instructions together with the dedicated arithmetic circuit. The general arithmetic circuit comprises: a program control circuit for outputting a first start signal, a second start signal, a first operation circuit selection signal, a second operation circuit selection signal, a dedicated pipeline operation circuit selection signal and a general arithmetic circuit output data enable signal, and receiving a dedicated arithmetic circuit output data enable signal; a first address generator for continuously outputting M first addresses on the basis of the first start signal from the program control circuit; a first data memory for outputting M pieces of first data on the basis of the first addresses from the first address generator; a first pipeline operation circuit for executing a pipeline operation for the first data from the first data memory and successively outputting M first operation results, in accordance with the first operation circuit selection signal from the program control circuit; a second pipeline operation circuit for executing a pipeline operation for second operation results from the dedicated arithmetic circuit and successively outputting M third operation results, in accordance with the second operation circuit selection signal from the program control circuit; a second address generator for continuously outputting M second addresses on the basis of the second start signal from the program control circuit; and a second data memory containing the M third operation results from the second pipeline operation circuit on the basis of the second addresses from the second address generator. The dedicated arithmetic circuit comprises: N dedicated pipeline operation circuits each outputting a signal notifying a number of pipeline stages, and executing a pipeline operation for the first operation results from the first pipeline operation circuit in the general arithmetic circuit; a data selection circuit for selecting n-th dedicated operation results from dedicated operation results which are respectively output by the plural dedicated pipeline operation circuits, in accordance with the dedicated pipeline operation circuit selection signal from the program control circuit in the general arithmetic circuit, and outputting the n-th dedicated operation results to the second pipeline operation circuit in the general arithmetic circuit as the second operation results; and a control circuit for receiving the signals each notifying the number of pipeline stages, each of which signals is output by each of the plural dedicated pipeline operation circuits, and the dedicated pipeline operation circuit selection signal and the general arithmetic circuit output data enable signal from the program control circuit in the general arithmetic circuit, and outputting the dedicated arithmetic circuit output data enable signal to the program control circuit in the general arithmetic circuit.

According to the above-described structure, the arithmetic unit is divided into the general arithmetic circuit and the dedicated arithmetic circuit. The dedicated arithmetic circuit output data enable as information inherent in the dedicated arithmetic circuit, required for the timing control by the program control circuit in the general arithmetic circuit is notified from the dedicated arithmetic circuit to the general arithmetic circuit so as to prevent the change in the dedicated arithmetic circuit for each purpose from affecting the pipeline operation in the general arithmetic circuit. The program control circuit in the general arithmetic circuit controls the output timing of the pipeline operation circuit on the basis of the dedicated arithmetic circuit output data enable signal as the notified information. That is, the program control circuit in the general arithmetic circuit decodes the vector instruction, then asserts the first start signal, and after the assertion of the first start signal, detects the output timing of first one of the first operation results from the first pipeline operation circuit on the basis of the number of pipeline stages of the first pipeline operation circuit. Simultaneously, the program control circuit asserts the general arithmetic circuit output data enable, and negates the first start signal after the assertion of the first start signal and after M cycles. After the negation of the first start signal, the program control circuit detects the output timing of M-th one of the first operation results from the first pipeline operation circuit on the basis of the number of pipeline stages of the first pipeline operation circuit, and simultaneously negates the general arithmetic circuit output data enable signal. The control circuit in the dedicated arithmetic circuit detects the output timing of first one of n-th dedicated operation results from an n-th dedicated pipeline operation circuit on the basis of an n-th signal notifying the number of pipeline stages, which signal is selected in accordance with a dedicated pipeline operation circuit selection signal, after the general arithmetic circuit output data enable signal is asserted. Simultaneously, the controls circuit asserts the dedicated arithmetic circuit output data enable signal, detects the output timing of the M-th one of the n-th dedicated operation results from the n-th dedicated pipeline operation circuit on the basis of the n-th signal notifying the number of pipeline stages which is selected in accordance with the dedicated pipeline operation circuit selection signal after the general arithmetic circuit output data enable signal is negated, and simultaneously negates the dedicated arithmetic circuit output data enable signal. Then, after the dedicated arithmetic circuit output data enable signal is asserted, the program control circuit detects the output timing of first one of the third operation results from the second pipeline operation circuit on the basis of the number of pipeline stages of the second pipeline operation circuit. Simultaneously, the program control circuit asserts the second start signal, then after the dedicated arithmetic circuit output data enable signal is negated, detects the output timing of M-th one of the third operation results from the second pipeline operation circuit on the basis of the number of pipeline stages of the second pipeline operation circuit, and simultaneously negates the second start signal. Therefore, the arithmetic unit of the present invention can mount an arbitrary dedicated pipeline operation circuit which is suitable for each purpose, without changing the program control circuit. Consequently, the arithmetic unit which can be applied to the various applications can be realized.

According to another embodiment of the present invention, the first pipeline operation circuit in the general arithmetic circuit comprises: a fist register for receiving the first data from the first data memory and outputting second data, on the basis of the first operation circuit selection signal from the program control circuit; a second register for outputting third data which are previously stored, a multiplier for receiving the second data from the first register and the third data from the second register, and outputting a result obtained by multiplying the second and third data as fourth data; a third register for receiving the fourth data from the multiplier, and outputting fifth data; a fourth register for outputting sixth data which are previously stored; an arithmetic operation unit for receiving the fifth data from the third register and the sixth data from the fourth register, and outputting a result of arithmetic of the fifth and sixth data as seventh data; and a fifth register for receiving the seventh data from the arithmetic operation unit, and outputting the first operation results as outputs of the first pipeline operation circuit. The second pipeline operation circuit in the general arithmetic circuit comprises: a sixth register for receiving the second operation results from the dedicated arithmetic circuit and outputting the third operation results as output of the second pipeline operation circuit, on the basis of the second operation circuit selection signal from the program control circuit. A specific one of the dedicated pipeline operation circuits in the dedicated arithmetic circuit comprises: an IDCT (Inversion Discrete Cosine Transform)

operation unit for receiving the first operation results from the first pipeline operation circuit, subjecting the results to one-dimensional inversion discrete cosine transform, and outputting the dedicated operation results as output of the dedicated pipeline operation circuit.

According to the above-described structure, the first pipeline operation circuit in the general arithmetic circuit performs the inverse quantization operation and the dedicated pipeline operation circuit in the dedicated arithmetic circuit performs the inversion DCT operation. Therefore, the inverse quantization and the inversion DCT operation can be continuously performed by the pipeline operation.

According to another embodiment of the present invention, the first pipeline operation circuit in the general arithmetic circuit comprises: a first register for receiving the first data from the first data memory and outputting the first operation results as outputs of the first pipeline operation circuit, on the basis of the first operation circuit selection signal from the program control circuit. The second pipeline operation circuit in the general arithmetic circuit comprises: a second register for receiving the second operation results from the dedicated arithmetic circuit and outputting second data, on the basis of the second operation circuit selection signal from the program control circuit; a third register for outputting third data which are previously stored; an arithmetic operation unit for receiving the second data from the second register and the third data from the third register, and outputting a result of arithmetic of the second and third data as fourth data; a fourth register for receiving the fourth data from the arithmetic operation unit and outputting fifth data; a fifth register for outputting sixth data which are previously stored; a multiplier for receiving the fifth data from the fourth register and the sixth data from the fifth register, and outputting a result which is obtained by multiplying the fifth and sixth data as seventh data; and a sixth register for receiving the seventh data from the multiplier, and outputting the third operation results as outputs of the second pipeline operation circuit. A specific one of the dedicated pipeline operation circuits in the dedicated arithmetic circuit comprises: a DCT (Discrete Cosine Transform) operation unit for receiving the first operation results from the first pipeline operation circuit in the general arithmetic circuit, subjecting the results to one-dimensional discrete cosine transform, and outputting the second dedicated operation results as outputs of the dedicated pipeline operation circuit.

According to the above-described structure, the second pipeline operation circuit in the general arithmetic circuit performs the quantization operation and the dedicated pipeline operation circuit in the dedicated arithmetic circuit performs the DCT operation. Therefore, the DCT operation and the quantization operation can be continuously performed by the pipeline operation.

According to another embodiment of the present invention, the arithmetic operation unit comprises: an adder for receiving a first input and a second input, and outputting a result which is obtained by adding the first and second inputs; a subtracter for receiving the first input and the second input, and outputting a result which is obtained by subtracting the second input from the first input, and an output selector for receiving the addition result of the adder, the subtraction result of the subtracter and "0", and outputting data which are selected from the addition result, the subtraction result and "0", the output selector selecting and outputting the addition result of the adder when the first input is a positive number, selecting and outputting "0" when the first input is "0", and selecting and outputting the subtraction result of the subtracter in other cases.

According to the above-described structure, the first pipeline operation circuit in the general arithmetic circuit performs the inverse quantization operation and the dedicated pipeline operation circuit in the dedicated arithmetic circuit performs the inversion DCT operation. Therefore, the inverse quantization and the inversion DCT operation can be cotinuously performed by the pipeline operation.

An image processing apparatus according to another embodiment of the present invention mounts a plurality of the arithmetic units, and the image processing apparatus comprises: a first arithmetic unit having a DCT operation circuit for receiving the first operation results, subjecting the first operation results to one-dimensional discrete cosine transform, and outputting first dedicated operation results, as a first dedicated pipeline operation circuit, and an IDCT operation circuit for receiving the first operation results, subjecting the first operation results to one-dimensional inversion discrete cosine transform, and outputting second dedicated operation results, as a second dedicated pipeline operation circuit, the second arithmetic unit having a half-pel operation circuit for receiving the first operation results, subjecting the first operation results to a half-pel operation, and outputting first dedicated operation results, as a first dedicated pipeline operation circuit, and a post-noise reduction filter operation circuit for receiving the first operation results, subjecting the first operation results to a post-noise reduction filter, and outputting second dedicated operation results, as a second dedicated pipeline operation circuit; a host interface for sending/receiving data to/from a host microcomputer; a video interface for receiving image data from an image A/D converter, subjecting the image data to pre-scaling and outputting CIF (Common Internet File) data or QCIF (Quadrature Common Internet File) data, or receiving CIF data or QCIF data, subjecting the CIF data or QCIF data to post-scaling and outputting the data to an image D/A converter; a DMA (Direct Memory Access) control circuit for controlling input/output of data from the host microcomputer via the host interface, input/output of data from a first data memory or a second data memory in the first arithmetic unit, input/output of data from a first data memory or a second data memory in the second arithmetic unit, and input/output of the CIF data or QCIF data from the video interface, to/from a bulk memory; and a common memory having a function of transferring data between the first arithmetic unit and the second arithmetic unit.

According to the above-described structure, the second pipeline operation circuit in the general arithmetic circuit performs the quantization and the dedicated pipeline operation circuit in the dedicated arithmetic circuit performs the DCT operation. Therefore, the DCT operation and the quantization operation can be continuously performed by the pipeline operation. In addition, the image processing apparatus mounts a plurality of the arithmetic units including the general arithmetic circuit and the dedicated arithmetic circuit. The first dedicated arithmetic circuit comprises the DCT operation circuit and the IDCT operation circuit, and the second dedicated arithmetic circuit comprises the post-noise reduction filter operation circuit and the half-pel operation circuit. Therefore, the image processing apparatus of the present invention functions as an encoder apparatus when only encoder operations are performed, functions as a decoder apparatus when only decoder operations are performed, and functions as a code apparatus when the encoder operations and decoder operations are performed in time-shared manners.

BRIEF DESCRIPTION OF THE DRAWINGS

FIGS. 3(a)–3(i) are diagrams showing operation expressions of inverse quantization in the arithmetic unit of the second embodiment.

FIG. 12 is a diagram showing allocation of processing to each block at an encoding time in the image processing apparatus of the fourth embodiment.

FIG. 13 is a diagram showing allocation of processing to each block at a decoding time in the image processing apparatus of the fourth embodiment.

BEST MODE FOR CARRYING OUT THE INVENTION

Hereinafter, embodiments of the present invention will be described with reference to FIGS. 1 to 8. The embodiments herein shown are only examples, and thus the present invention is not limited to these embodiments.

Embodiment 1

Figure 1:
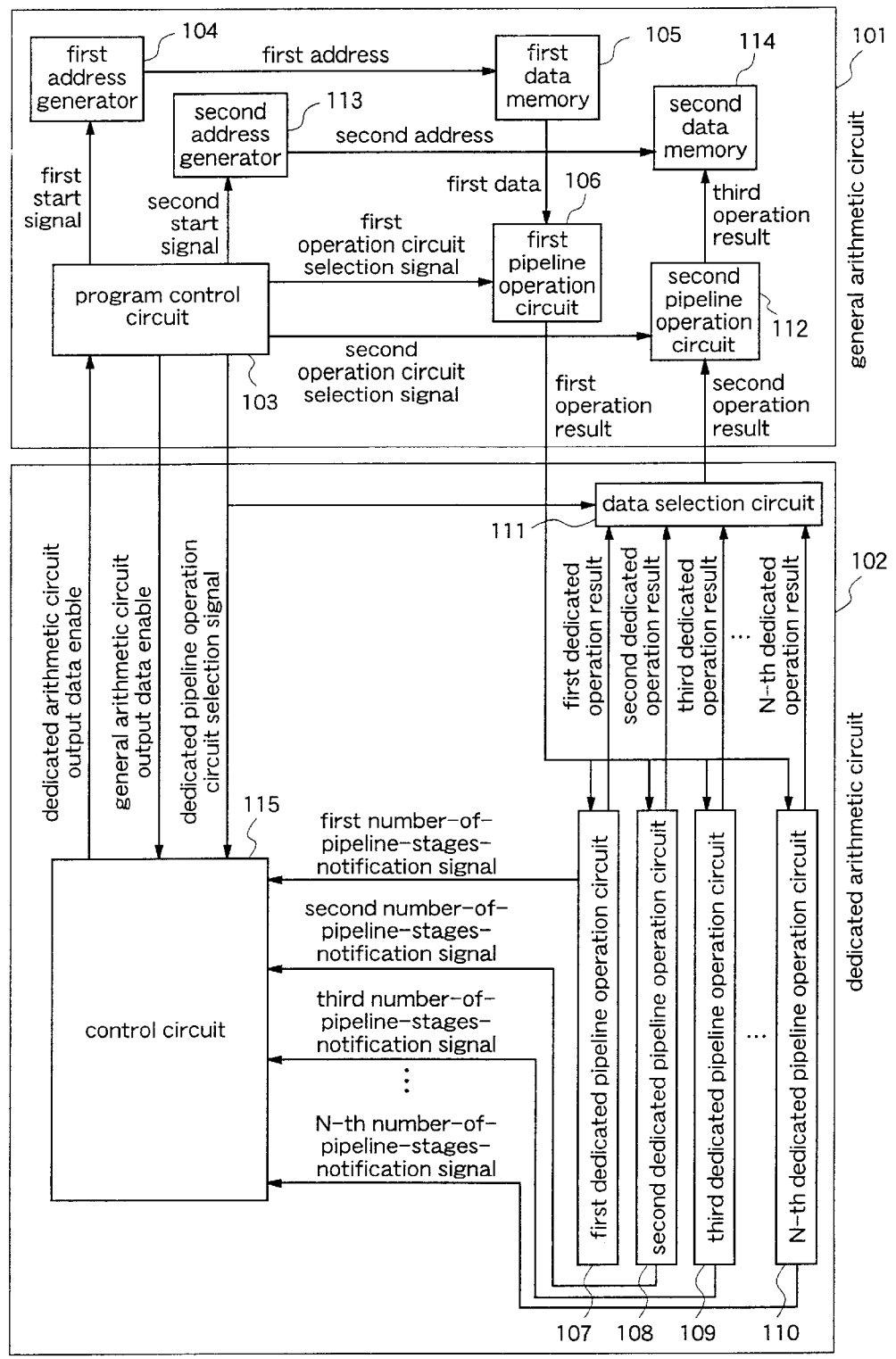
FIG. 1 is a block diagram illustrating a structure of an arithmetic unit according to a first embodiment.

FIG. 1 is a block diagram illustrating a structure of an arithmetic unit according to a first embodiment of the present invention.

The arithmetic unit according to the first embodiment is a program-controlled processor which mounts vector instructions. As shown in FIG. 1, the arithmetic unit is divided into a general arithmetic circuit 101 and a dedicated arithmetic circuit 102. The general arithmetic circuit 101 comprises a program control circuit 103, a first address generator 104, a first data memory 105, a first pipeline operation circuit 106, a second address generator 113, a second data memory 114, and a second pipeline operation circuit 112. In addition, the dedicated arithmetic circuit 102 comprises a control circuit 115, a first dedicated pipeline operation circuit 107, a second dedicated pipeline operation circuit 108, a third dedicated pipeline operation circuit 109, . . . , and a N-th dedicated pipeline operation circuit 110, each of which dedicated pipeline operation circuits is tailored to higher load operation for each purpose.

The program control circuit 103 is constituted by a program memory, an instruction decoder and a sequencer, and has an instruction parsing function and an instruction execution control function for the vector instructions in addition to normal scalar instructions. When the vector instruction is executed, the program control circuit initially outputs a first operation circuit selection signal, a second operation circuit selection signal and a dedicated pipeline operation circuit selection signal. Simultaneously, the program control circuit asserts a first start signal, then asserts a general arithmetic circuit output data enable after cycles of the number of pipeline stages in the first pipeline operation circuit 106. Then, the program control circuit asserts a dedicated arithmetic circuit output data enable, and thereafter asserts a second start signal after cycles of the number of pipeline stages in the second pipeline operation circuit. Assuming that the length of vector data which is previously set is M pieces, after M cycles after the initial assertion of the first start signal, the program control circuit negates the first start signal and then negates the general arithmetic circuit output data enable after cycles of the number of the pipeline stages in the first pipeline operation circuit 106. Then, after negating the dedicated arithmetic circuit output data enable, the program control circuit negates the second start signal after cycles of the number of the pipeline stages in the second pipeline operation circuit 112.

The first address generator 104 outputs a predetermined address as a first address during the assertion of the first start signal.

The first data memory 105 outputs first data according to the first address.

The first pipeline operation circuit 106 is constituted by combining basic arithmetic units such as a multiplier, an arithmetic logic operation unit and a barrel shifter, in accordance with the first operation circuit selection signal which is output after the instruction parsing by the program control circuit 103. The first pipeline operation circuit 106 subjects the first data to the pipeline operation, and outputs a first operation result.

The second address generator 113 outputs a predetermined address as a second address during the assertion of the second start signal.

The second pipeline operation circuit 112 is constituted by combining basic arithmetic units such as a multiplier, an arithmetic logic operation unit and a barrel shifter, in accordance with the second operation circuit selection signal which is output after the instruction parsing by the program control circuit 103. The second pipeline operation circuit 112 subjects the second data to the pipeline operation, and outputs a third operation result.

The second data memory 114 contains the third operation result according to the second address.

After the assertion of the general arithmetic circuit output data enable, the control circuit 115 asserts the dedicated arithmetic circuit output data enable after cycles of the number of stages indicated by a n-th signal notifying the number of pipeline stages (hereinafter referred to as n-th number-of-pipeline-stages-notification signal), which is selected among a first number-of-pipeline-stages-notification signal, a second number-of-pipeline-stages-notification signal, a third number-of-pipeline-stages-notification signal, . . . , and a N-th number-of-pipeline-stages-notification signal in accordance with the dedicated pipeline operation circuit selection signal. Then, the control circuit negates the dedicated arithmetic circuit output data enable after the negation of the general arithmetic circuit output data enable and after cycles of the number of stages indicated by the n-th number-of-pipeline-stages-notification signal.

The first dedicated pipeline operation circuit 107, the second dedicated pipeline operation circuit 108, the third dedicated pipeline operation circuit 109, . . . , and the N-th dedicated pipeline operation circuit 110 subject the first operation result to the pipeline operation, and output a first dedicated operation result, a second dedicated operation result, a third dedicated operation result, . . . , and a N-th dedicated operation result, respectively. On the other hand, the dedicated pipeline operation circuits 107 to 110 output the first number-of-pipeline-stages-notification signal, the second number-of-pipeline-stages-notification signal, the third number-of-pipeline-stages-notification signal, . . . , and the N-th number-of-pipeline-stages-notification signal each notifying the number of pipeline stages.

The data selection circuit 111 selects one of the first dedicated operation result, the second dedicated operation result, the third dedicated operation result, . . . , and the N-th dedicated operation result in accordance with the dedicated pipeline operation circuit selection signal, and outputs the selected result.

Next, the operation is described in a case where the vector instruction is parsed by the program control circuit 103 and the pipeline operation for the M pieces of vector data is executed.

Initially, the first start signal is asserted, and outputting of consecutive M first addresses from the first address generator 104 is started. Consecutive M pieces of first data are read from the first data memory in accordance with the first addresses, and input to the first pipeline operation circuit 106. The first pipeline operation circuit 106 successively executes the arithmetic for the first data, and successively outputs the first operation results. At this time, the program control circuit 103 detects the output timing of first one of the first data from the first pipeline operation circuit 106, and asserts the general arithmetic circuit output enable. The first dedicated pipeline operation circuit 107, the second dedicated pipeline operation circuit 108, the third dedicated pipeline operation circuit 109, . . . , and the N-th dedicated pipeline operation circuit 110 successively execute the arithmetic for the first operation results, and successively outputs the first dedicated operation results, the second dedicated operation results, the third dedicated operation results, . . . , and the N-th dedicated operation results, respectively. Results selected among these dedicated operation results by the data selection circuit 111 in accordance with the dedicated pipeline operation circuit selection signal which is output in the parsing of the vector instruction by the program control circuit 103 are output as the second operation results. At this time, the output timing of first one of the second operation results is detected on the basis of the assertion timing of the general arithmetic circuit output data enable and one of the first number-of-pipeline-stages-notification signal, the second number-of-pipeline-stages-notification signal, the third number-of-pipeline-stages-notification signal, . . . , and the N-th number-of-pipeline-stages-notification signal, which is selected in accordance with the dedicated pipeline operation circuit selection signal output by the program control circuit, and the dedicated arithmetic circuit output data enable is asserted. The second pipeline operation circuit 112 successively executes the arithmetic for the second operation results and outputs the third operation results. The output timing of first one of the third operation result is detected on the basis of the assertion timing of the dedicated arithmetic circuit output data enable and the number of pipeline stages in the second pipeline operation circuit 112, and the second start signal is asserted. The second address generator 113 receives the asserted second start signal, and the outputting of consecutive M addresses from the second address generator 113 is started. The consecutive M third operation results are stored in the second data memory in accordance with the second addresses. The program control circuit 103 detects the timing of reading M-th one of the first data from the first data memory 105, and negates the first start signal. Then, the program control circuit detects the timing of outputting M-th one of the first operation results from the first pipeline operation circuit 106 on the basis of the negation timing of the first start signal and the number of pipeline stages in the first pipeline operation circuit 106, and negates the general arithmetic circuit output data enable. The control circuit 115 detects the timing of outputting M-th one of the second operation results on the basis of the negation timing of the general arithmetic circuit output data enable and the one of the first number-of-pipeline-stages-notification signal, the second number-of-pipeline-stages-notification signal, the third number-of-pipeline-stages-notification signal, . . . , and the N-th number-of-pipeline-stages-notification signal, which is selected in accordance with the dedicated pipeline operation circuit selection signal output by the program control circuit, and negates the dedicated arithmetic circuit output data enable. The program control circuit detects the timing of M-th output from the second pipeline operation circuit on the basis of the negation timing of the dedicated arithmetic circuit output data enable and the number of pipeline stages in the second pipeline operation circuit, and negates the second start signal, thereby terminating the present instruction.

As described above, the arithmetic unit according to the first embodiment is divided into the general arithmetic circuit 101 and the dedicated arithmetic circuit 102. The dedicated arithmetic circuit output data enable which is information inherent in the dedicated arithmetic circuit 102, required for the timing control by the program control circuit 103 in the general arithmetic circuit 101, is notified from the dedicated arithmetic circuit 102 to the general arithmetic circuit 101 so as to prevent the change in the dedicated arithmetic circuit 102 for each purpose from affecting the general arithmetic circuit 101. Then, the program control circuit 103 in the general arithmetic circuit 101 controls the timing on the basis of the dedicated arithmetic circuit output data enable as the notified information. Therefore, the arithmetic unit which can be applied to various applications is realized. Further, in considering the age of IP (Intellectual Property) which will come in the future, the more flexibility toward the various applications can be obtained.

Embodiment 2

Figure 2:
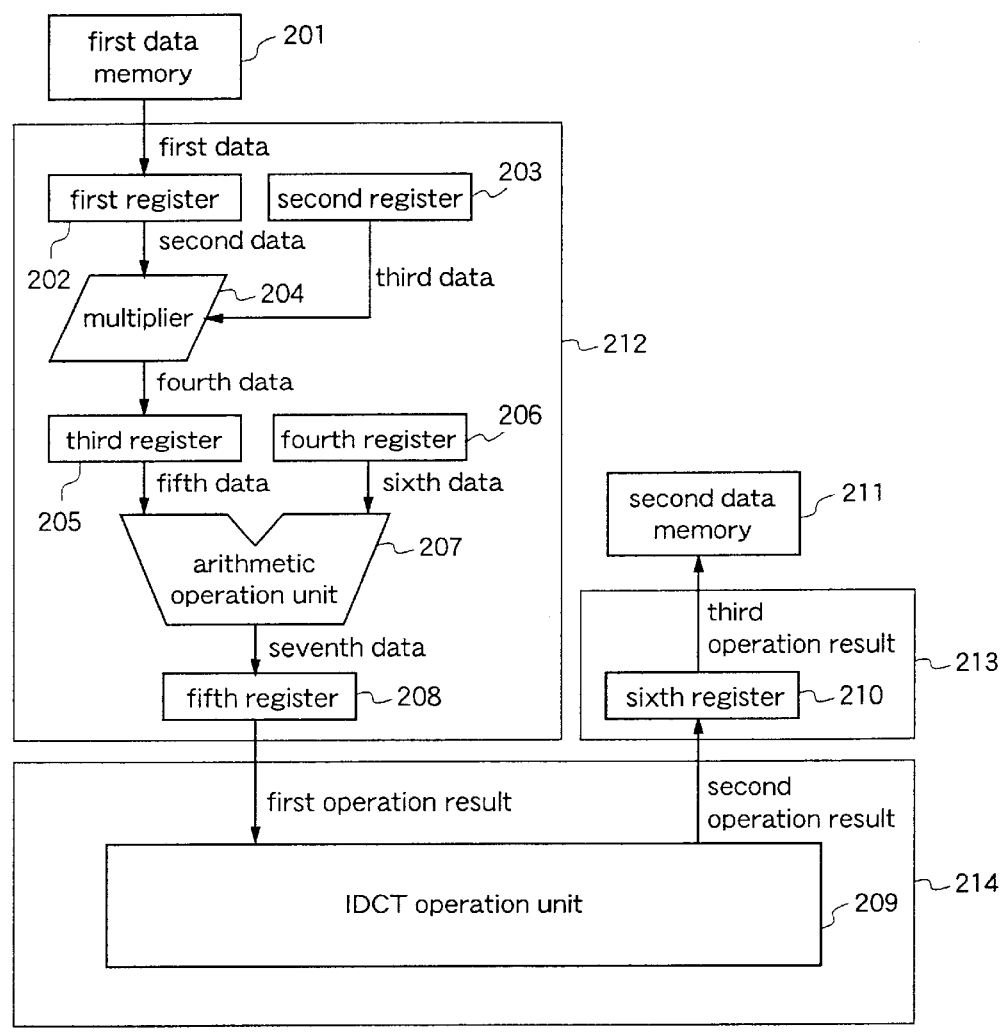
FIG. 2 is a block diagram schematically illustrating a structure of an arithmetic unit according to a second embodiment.

FIG. 2 is a block diagram schematically illustrating a structure of an arithmetic unit according to a second embodiment of the present invention.

With respect to the arithmetic unit of the first embodiment as shown in FIG. 1, in the arithmetic unit of the second embodiment as shown in FIG. 2, reference numeral 201 corresponds to the first data memory 105 of the first embodiment. Numeral 211 corresponds to the second data memory 114 of the first embodiment. Numeral 212 corresponds to the first pipeline operation circuit 106 of the first embodiment. Numeral 213 corresponds to the second pipeline operation circuit 112 of the first embodiment. Numeral 214 corresponds to one of the plural dedicated pipeline operation circuits 107~110 of the first embodiment. Other structure except the above-described elements in the arithmetic unit of the second embodiment is similar to that of the first embodiment as shown in FIG. 1.

The first pipeline operation circuit 212 comprises a first register 202, a second register 203, a multiplier 204, a third register 205, a fourth register 206, an arithmetic operation unit 207, and a fifth register 208. The second pipeline operation circuit 213 comprises a sixth register 210. The dedicated pipeline operation circuit 214 comprises an IDCT (Inversion Discrete Cosine Transform) arithmetic unit 209. This IDCT operation unit 209 performs one-dimension inversion discrete cosine transform.

FIGS. 3(a)–3(i) show operation expressions of inverse quantization in the arithmetic unit of the second embodiment.

As shown in the figure, expansion of expressions 3(a), 3(b), 3(c) and 3(d) results in expressions 3(e), 3(f), 3(g), 3(h) and 3(i). To be specific, the expression (d) is decided on the basis of the expressions 3(a)–3(c). Then, one of the expressions 3(e)–3(i) is obtained on the basis of the expression 3(d).

Previously, "LEVEL" as data to be inversely quantized in FIGS. 3(a)–3(i) is stored in the first data memory 201, "(2×QUANT)" in FIGS. 3(a)–3(i) is stored in the second register 203, and when "QUANT" is an odd number, "QUANT" is stored and when "QUANT" is an even number, "(QUANT−1)" is stored in the fourth register 206, respectively.

Figures 4, 5, 6:
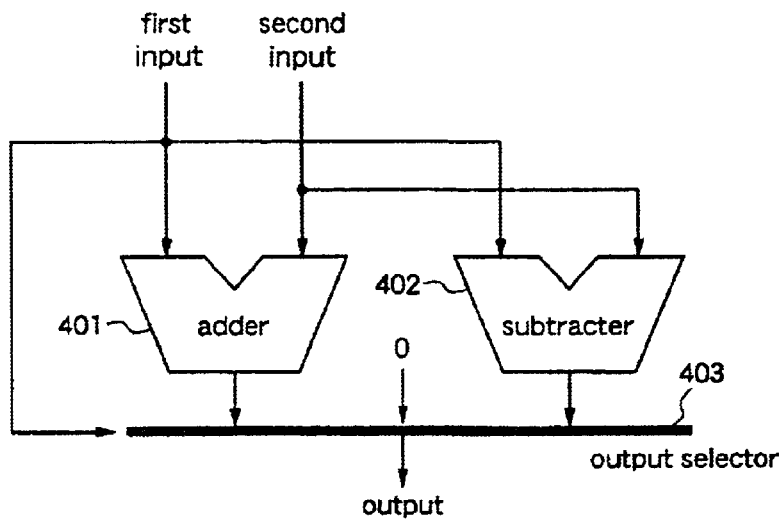
FIG. 4 is a block diagram illustrating a structure of an arithmetic operation unit in the arithmetic unit of the second embodiment.
FIG. 5 is a diagram showing control of output data of an output selector in the arithmetic operation unit of the arithmetic unit of the second embodiment.
FIG. 6 is a diagram showing the relationship between inputs and outputs of the arithmetic operation unit of the arithmetic unit of the second embodiment.

FIG. 4 shows a structure of the arithmetic operation unit 207 shown in FIG. 2. As shown in FIG. 4, the arithmetic operation unit 207 comprises an adder 401, a subtracter 402, and an output selector 403. As shown in FIG. 5, the output selector 403 in the arithmetic operation unit 207 operates in accordance with the sign of a first input. In FIG. 4, the first input corresponds to fifth data as an output of the third register 205 and a second input corresponds to sixth data of the fourth register 206. As shown in FIG. 5, the output selector 403 outputs an output of the adder 401 when the sign of the first input is positive, of the first input when the sign of the first input is "0", and an output of the subtracter 402 when the sign of the first input is negative.

Accordingly, inputs and outputs of the arithmetic operation unit 207 have the relationship as shown in FIG. 6.

Figure 7:
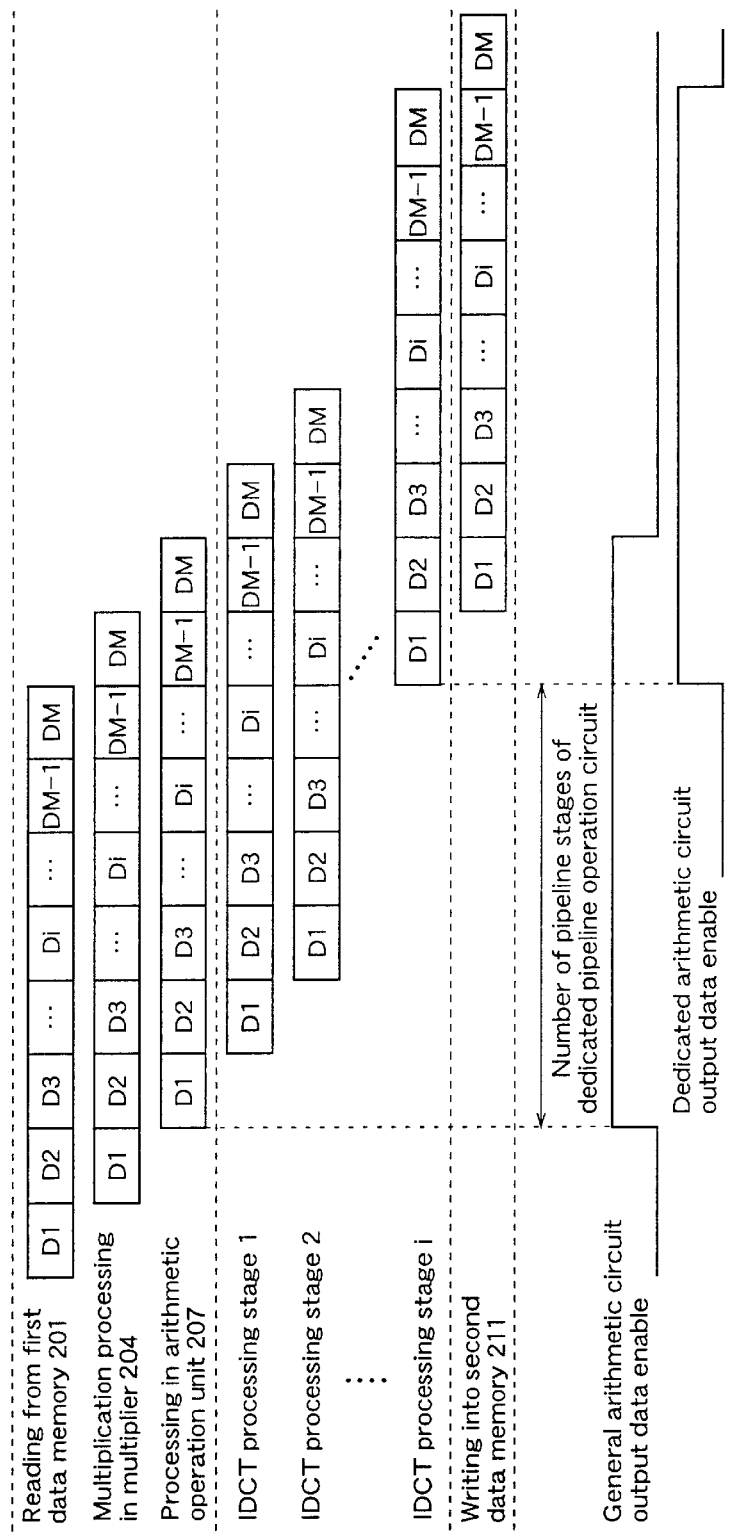
FIG. 7 is a diagram showing the flow of vector data in a pipeline operation unit in the arithmetic unit of the second embodiment.

When the respective pipeline operation circuits 212, 214 and 213 in the arithmetic unit of the second embodiment as shown in FIG. 2 are controlled in the control procedure described in the first embodiment, the data flow as shown in FIG. 7. In FIG. 7, the cycles are shown in the horizontal direction and the contents of processing in the respective operation units are shown in the vertical direction. This figure shows the M pieces of vector data, i.e., D1, D2, . . . , Di, . . . , DM-1, DM, passing through the respective pipeline operation circuits. Finally, "REC" shown in FIG. 3 is written in the second data memory 211.

As described above, according to the arithmetic unit of the second embodiment, the first pipeline operation circuit 212 in the general arithmetic circuit 101 performs the inverse quantization operation and the dedicated pipeline operation circuit 214 in the dedicated arithmetic circuit 102 performs the inverse DCT operation. Thereby, the inverse quantization and the inverse DCT operation can be continuously performed by the pipeline operation.

Embodiment 3

Figure 8:
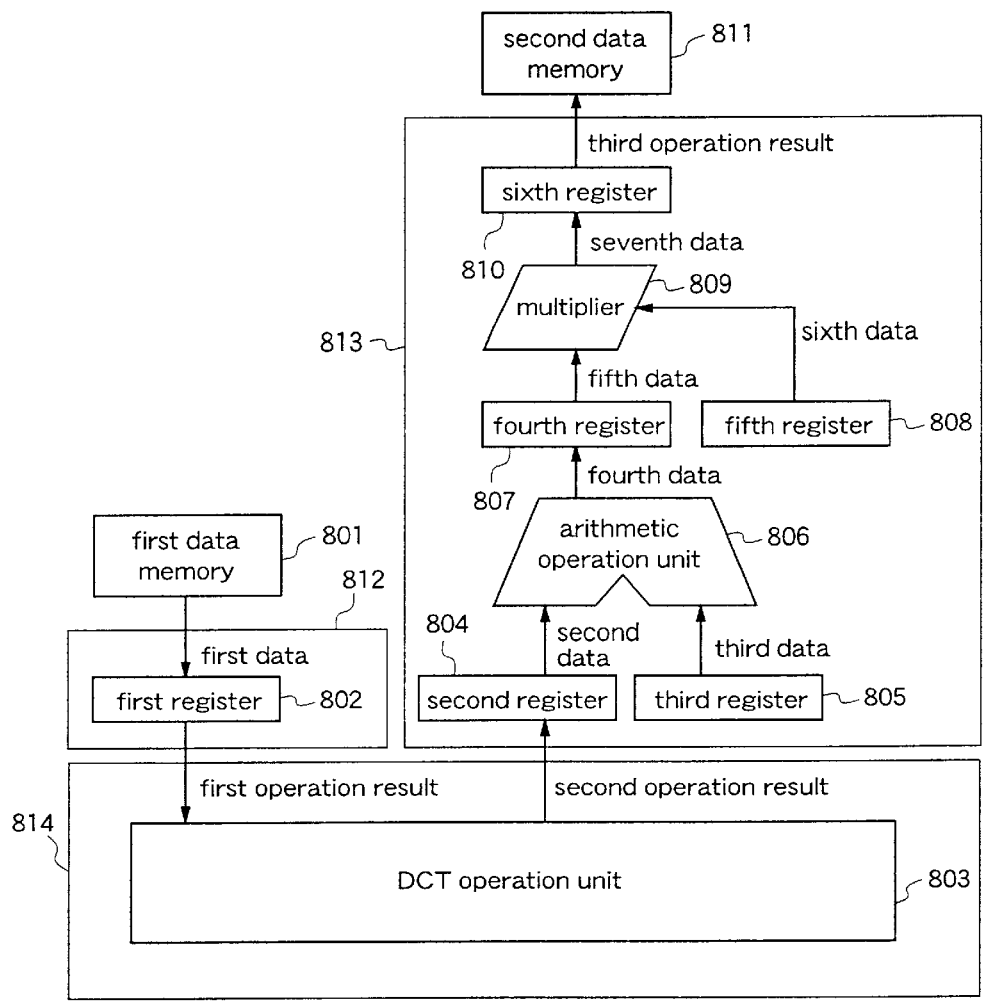
FIG. 8 is a block diagram schematically illustrating a structure of an arithmetic unit of a third embodiment.

FIG. 8 is a block diagram schematically illustrating a structure of an arithmetic unit according to a third embodiment of the present invention.

With respect to the arithmetic unit of the first embodiment as shown in FIG. 1, in the arithmetic unit of the third embodiment as shown in FIG. 8, numeral 801 corresponds to the first data memory 105 of the first embodiment. Numeral 812 corresponds to the first pipeline operation circuit 106 of the first embodiment. Numeral 813 corresponds to the second pipeline operation circuit 112 of the first embodiment. Numeral 814 corresponds to one of the plural dedicated pipeline operation circuits 107~110 of the first embodiment. Other structure except the above-described elements in the arithmetic unit of the third embodiment is similar to that of the first embodiment as shown in FIG. 1.

The first pipeline operation circuit 812 comprises a first register 802. The second pipeline operation circuit 813 comprises a second register 804, a third register 805, an arithmetic operation unit 805, a fourth register 807, a fifth register 808, a multiplier 809, and a six register 810. In addition, the dedicated pipeline operation circuit 814 comprises a DCT (Discrete Cosine Transform) arithmetic unit 803. This DCT operation unit 803 performs discrete cosine transform.

FIGS. 9(a)–9(i) show operation expressions of quantization in the arithmetic unit of the third embodiment.

Figure 9:
FIGS. 9(a)–9(i) are diagrams showing operation expressions of quantization in the arithmetic unit.

In the FIG. 9, expansion of expressions 9(a), 9(b), 9(c) and 9(d) results in expressions 9(e), 9(f), 9(g), 9(h) and 9(i). To be specific, the expression 9(d) is decided on the basis of the expressions 9(a)~9(c) and one of the expressions 9(e)~9(i) is obtained on the basis of the expression 9(d).

Previously, "REC" as DCT target data in FIGS. 9(a)–9(i) is stored in the first data memory 801, and when "QUANT" is an odd number, "(−QUANT)" in FIGS. 9(a)–9(i) is stored and when "QUANT" is an even number, "(−QUANT+1)" is stored, respectively, in the second register 802, and the inverse of "2×QUANT" is stored in the fifth register 808.

Here, the arithmetic operation unit 806 has the same structure as that of the second embodiment as shown in FIG. 4. A first input thereof corresponds to second data from the second register 804 and a second input corresponds to third data from the third register 805. In addition, inputs and outputs of the arithmetic operation unit 806 also have the relationship as shown in FIGS. 5 and 6.

Figure 10:
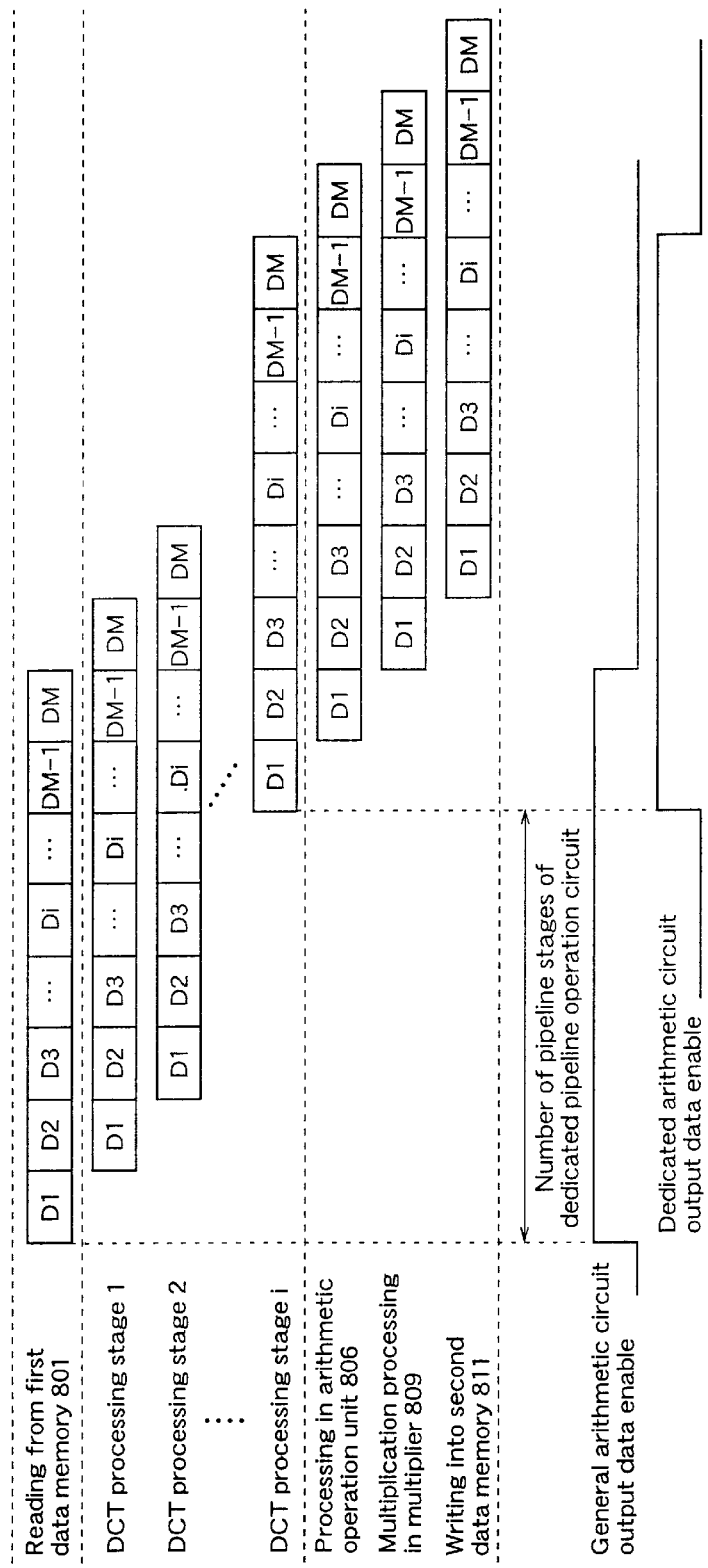
FIG. 10 is a diagram showing the flow of vector data in a pipeline operation unit in the arithmetic unit of the third embodiment.

When the respective pipeline operation circuits 812, 814 and 813 in the arithmetic unit of the third embodiment as shown in FIG. 8 are controlled in the control procedure described in the first embodiment, the data flow as shown in FIG. 10. In FIG. 10, the cycles are shown in the horizontal direction and the contents of processing in the respective operation units are shown in the vertical direction, and this figure shows the M pieces of vector data, i.e., D1, D2, . . . , Di, . . . , DM-1, DM, passing through the respective pipeline operation circuits. Finally, "LEVEL" as shown in FIGS. 9(a)–9(i) is written in the second data memory 811.

As described above, according to the arithmetic unit of the third embodiment, the second pipeline operation circuit 813 in the general arithmetic circuit 101 performs the quantization operation and the dedicated pipeline operation circuit 814 in the dedicated arithmetic circuit 102 performs the DCT operation. Thereby, the DCT operation and the quantization operation can be continuously performed by the pipeline operation.

Embodiment 4

Figure 11:
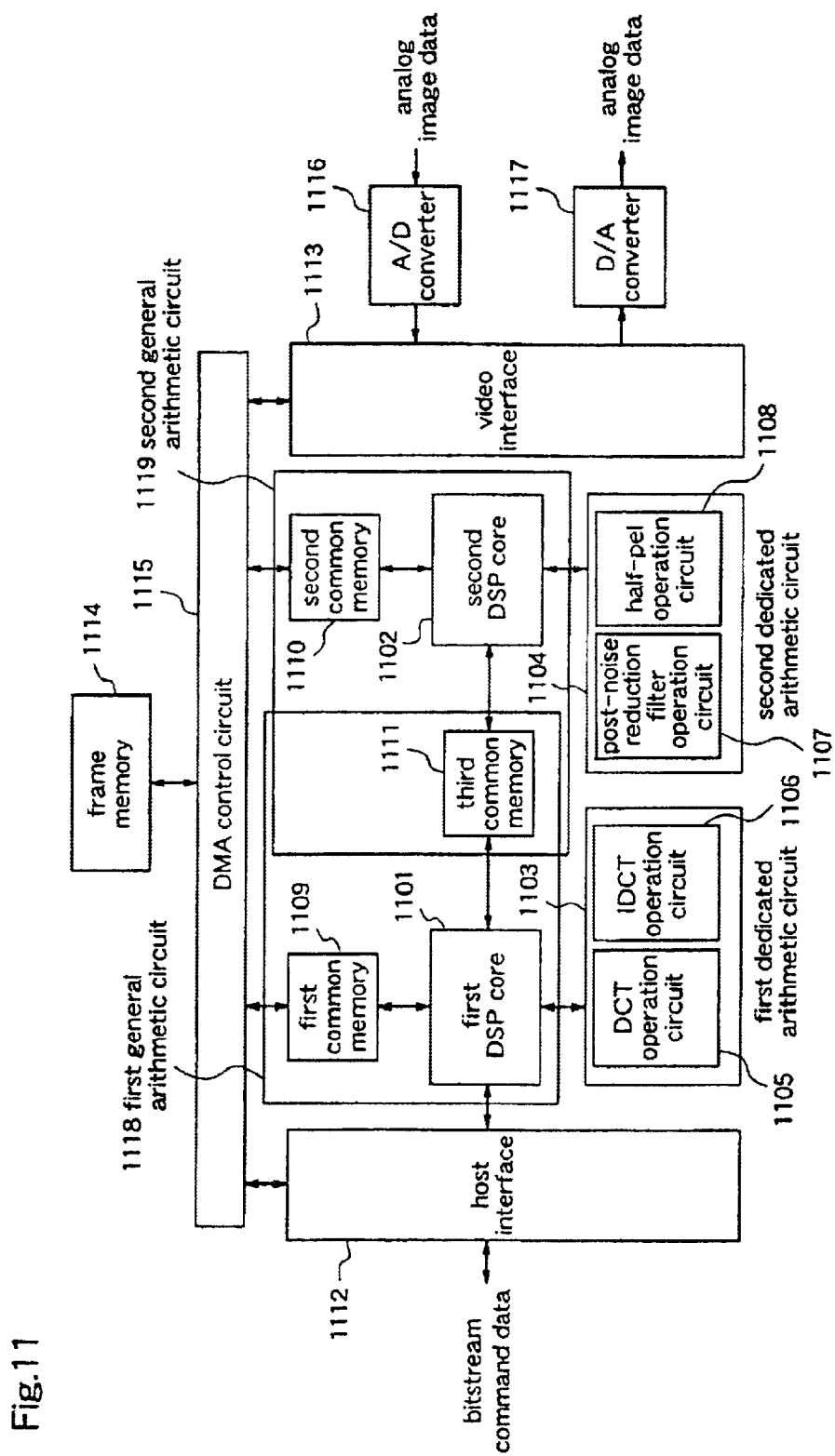
FIG. 11 is a block diagram illustrating a structure of an image processing apparatus according to a fourth embodiment.
Figure 14:
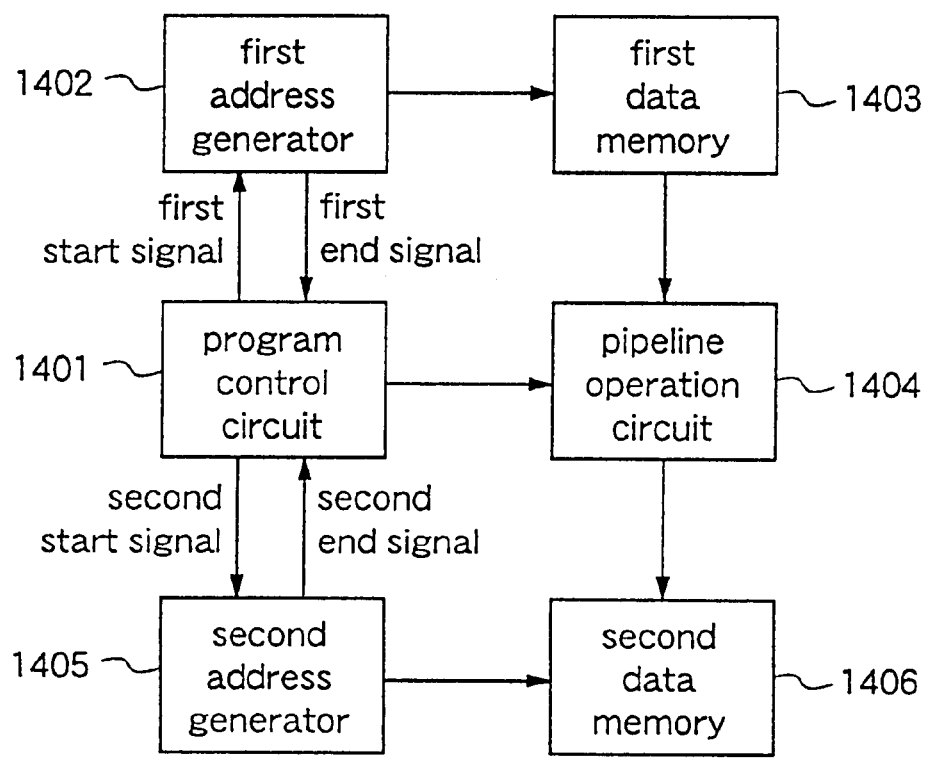
FIG. 14 is a diagram illustrating a structure of a prior art arithmetic unit.

FIG. 11 is a block diagram illustrating a structure of an image processing apparatus according to a fourth embodiment of the present invention.

In the image processing apparatus of the fourth embodiment as shown in FIG. 11, a first DSP (Digital Signal Processor) core 1101 and a second DSP (Digital Signal Processor) core 1102 are program-controlled processors. A first general arithmetic circuit 1118 and a second general arithmetic circuit 1119 correspond to the general arithmetic circuit 101 in FIG. 1 as described in the first embodiment. In addition, a first dedicated arithmetic circuit 1103 and a second dedicated arithmetic circuit 1104 correspond to the dedicated arithmetic circuit 102 in FIG. 1 as described in the first embodiment. The first dedicated arithmetic circuit 1103 mounts a DCT operation circuit 1105 and an IDCT operation circuit 1106 as any of the dedicated pipeline operation circuits 107~110. The second dedicated arithmetic circuit 1104 mounts a post-noise reduction filter operation circuit 1107 and a half-pel operation circuit 1108 as any of the dedicated pipeline operation circuits 107~110. The image processing apparatus of the fourth embodiment comprises a first shared memory 1109, a second shared memory 1110, a third shared memory 1111, a host interface 1112, a video interface 1113, a frame memory 1114, a DMA (Direct Memory Access) control circuit 1115, an A/D converter 1116 and a D/A converter 1117, in addition to the above-described elements.

The first DSP core 1101 has functions of executing a closed operation in the first DSP core 1101, executing an operation using the first dedicated arithmetic circuit 1103, and performing transfer of data to/from the second DSP core 1102, the host interface 1112 and the DMA control circuit 1115, respectively, in accordance with a program.

The first dedicated arithmetic circuit 1103 has functions of executing the DCT operation and the IDCT operation in accordance with control of the first DSP core 1101.

The second DSP core 1102 has functions of executing a closed operation in the second DSP core 1102, executing an operation using the second dedicated arithmetic circuit 1104, and performing data transfer to/from the first DSP core 1101 and the DMA control circuit 1115, respectively, in accordance with a program.

The second dedicated arithmetic circuit 1104 has functions of executing a half-pel operation and a post-noise reduction filter operation in accordance with control of the second DSP core 1102.

The first shared memory 1109 has a function of transferring data between the first DSP core 1101 and the DMA control circuit 1115.

The second shared memory 1110 has a function of transferring data between the second DSP core 1102 and the DMA control circuit 1115.

The third shared memory 1111 has a function of transferring data between the first DSP core 1101 and the second DSP core 1102.

The host interface 1112 has a function of inputting or outputting bitstreams or command data, and a function of performing transfer of data to/from the first DSP core 1101 and the DMA control circuit 1115, respectively.

The frame memory 1114 has functions of outputting stored data to the DMA control circuit 1115 and containing data input from the DMA control circuit 1115.

The DMA control circuit 1115 has a function of storing data which are respectively input from the first shared memory 1109, the second shared memory 1110, the host interface 1112 and the video interface 1114, in the frame memory 1114, and a function of outputting data output from the frame memory 1113 to the first shared memory 1109, the second shared memory 1110, the host interface 1112 and the video interface 1113, respectively.

The video interface 1113 has a function of performing transfer of data to/from the DMA control circuit 1115, a post-scaling function, a function of outputting post-scaled data to the D/A converter 1117, a function of receiving image data from the A/D converter 1116, and a function of pre-scaling the image data which are input from the A/D converter 1116.

The A/D converter 1116 has a function of converting input analog image data into digital data and outputting the digital data to the video interface 1113.

The D/A converter 1117 has a function of converting digital image data input by the video interface 1113 into analog data and outputting the analog data.

Next, encoder processing and decoder processing in the image processing apparatus of the fourth embodiment will be described.

Initially, the operation of the encoder processing is described. FIG. 12 shows contents of processing in the respective blocks 1112, 1101, 1102 and 1113 in the encoder processing by the image processing apparatus of the fourth embodiment. The processing allocated to the respective blocks which are shown collectively in FIG. 12 is subjected to parallel processing by the respective blocks, whereby the encoder processing by the image processing apparatus of the fourth embodiment is efficiently performed.

In the encoder processing, the analog image data are initially input to the A/D converter 1116, then converted into the digital data, and the digital data are input to the video interface 1113. The data input to the video interface 1113 is subjected to a prescaler, converted into formats of CIF (Common Internet File) or QCIF (Quadrature Common Internet File), and stored in a predetermined area in the frame memory 1114 via the DMA control circuit 1115. Data to be coded after subjecting to the prescaler are subjected to ME (Motion Estimation) processing in accordance with the program of the second DSP core 1102, via the second shared memory 1110. In this process, the half-pel operation is required. Therefore, the second dedicated arithmetic circuit 1104 is employed and its half-pel operation circuit 1108 executes the half-pel operation. When the ME processing is finished, the data to be coded are transferred to the first DSP core 1101 via the third shared memory 1111. In the first DSP core 1101, MC (Motion compensation) processing, DCT operation processing, Q (Quantization) processing, IQ (Inverse Quantization) processing, IDCT operation processing and VLC (Variable Length Coding) processing are performed in accordance with the program. Coded image data are finally stored in a predetermined area in the frame memory 1114 via the DMA control circuit 1115. In this process, the DCT operation processing and the IDCT operation processing are executed using the DCT operation circuit 1105 and the IDCT operation circuit 1106 in the first dedicated arithmetic circuit 1103. On the other hand, the coded data are read from the frame memory 1114 via the DMA control circuit 1115 to the host interface 1112 in accordance with the command data received by the host interface 1112, and output as the bitstreams.

Then, the operation in the decoder processing is described. FIG. 13 shows contents of processing in the respective blocks 1112, 1101, 1102 and 1113 in the decoder processing by the image processing apparatus of the fourth embodiment. The processing allocated to the respective blocks which are shown collectively in FIG. 13 is subjected to parallel processing by the respective blocks, whereby the decoder processing by the image processing apparatus of the fourth embodiment is efficiently executed.

In the decoder processing, a bitstream is initially input in accordance with command data received by the host interface 1112, and stored in a predetermined area in the frame memory 1114 via the DMA control circuit 1115. The bitstream data are read from the frame memory 1114 via the DMA control circuit 1115 to the first shared memory 1109, subjected to VLD (Variable Length Decoding) processing, IQ (Inverse Quantization) processing, IDCT operation processing and MC (Motion Compensation) processing in accordance with the program of the first DSP core 1101, and stored in a predetermined area in the frame memory 1114 from the first shared memory 1109 via the DMA control circuit 1115 as decoded image data. The decoded image data are read from the frame memory 1114 to the second shared memory via the DMA control circuit 1115 in accordance with the program of the second DSP core 1102, subjected to a post-noise reduction filter using the second dedicated arithmetic circuit 1104, and stored in a predetermined area in the frame memory 1114 from the second shared memory 1110 via the DMA control circuit 1115. The data which was subjected to the post-noise reduction filter are input from the frame memory 1114 to the video interface 1113 via the DMA control circuit 1115, subjected to a postscaler, and output to the D/A converter 1117. The D/A converter 1117 converts the input digital image data into analog data, and outputs the analog data.

As described above, the image processing apparatus according to the fourth embodiment mounts two arithmetic units including the general arithmetic circuit 101 and the dedicated arithmetic circuit 102 as shown in FIG. 1. The first dedicated arithmetic circuit 1103 comprises the DCT operation circuit 1105 and the IDCT operation circuit 1106. The second dedicated arithmetic circuit 1104 comprises the post-noise reduction filter operation circuit 1107 and the half-pel operation circuit 1108. Therefore, the fourth embodiment realizes the image processing apparatus which operates as an encoder unit when only the encoder operation is performed, operates as a decoder unit when only the decoder operation is performed, and further operates as a code unit when the encoder operation and the decoder operation are performed in a time-shared manner.

Industrial Availability

As described above, the arithmetic unit according to the present invention is considerably useful as an arithmetic unit which can mount an arbitrary dedicated pipeline operation circuit which is suitable for each purpose without changing the program control circuit, and consequently can be applied to various applications. Further, the arithmetic unit of the present invention is considerably useful as an arithmetic unit which realizes the image processing apparatus operating as the encoder unit when only the encoder operation is performed, operating as the decoder unit when only the decoder operation is performed, and further operating as the code unit when the encoder operation and the decoder operation are performed in a time-shared manner, with using this arithmetic unit.

What is claimed is:

1. An arithmetic unit having a general arithmetic circuit and a dedicated arithmetic circuit, the general arithmetic circuit mounting plural vector instructions and executing a pipeline operation on the vector instructions together with the dedicated arithmetic circuit, wherein said general arithmetic circuit outputs:
    a dedicated pipeline operation circuit selection signal notifying a content of arithmetic in the dedicated arithmetic circuit;
    plural operation results of the general arithmetic circuit; and
    a general arithmetic circuit output data enable signal notifying an output timing of the plural operation results, to the dedicated arithmetic circuit, and receives:
    plural dedicated operation results of the dedicated arithmetic circuit; and
    a dedicated arithmetic circuit output data enable signal for recognizing an output timing of the plural dedicated operation results and a termination timing of the output data, from the dedicated arithmetic circuit, and
the dedicated arithmetic circuit comprises:
    plural dedicated pipeline operation circuits each outputting a signal notifying a number of pipeline stages and executing a pipeline operation for the plural operation results of the general arithmetic circuit;
    a data selection circuit for selecting dedicated operation results which are output by one of the plural dedicated pipeline operation circuits, from dedicated operation results which are respectively output by the plural dedicated pipeline operation circuits, in accordance with the dedicated pipeline operation circuit selection signal of the general arithmetic circuit, and outputting the arbitrarily selected dedicated operation results as the plural dedicated operation results to the general arithmetic circuit; and
    a control circuit for receiving the signals each notifying the number of pipeline stages, each of which signals is output by each of the plural dedicated pipeline operation circuits, and the dedicated pipeline operation circuit selection signal and the general arithmetic circuit output data enable signal of the general arithmetic circuit, and outputting the dedicated arithmetic circuit output data enable signal to the general arithmetic circuit.

2. An arithmetic unit having a general arithmetic circuit and a dedicated arithmetic circuit, the general arithmetic circuit mounting plural vector instructions and executing a pipeline operation on the vector instructions together with the dedicated arithmetic circuit, wherein said general arithmetic circuit comprises:
    a program control circuit for outputting a first start signal, a second start signal, a first operation circuit selection signal, a second operation circuit selection signal, a dedicated pipeline operation circuit selection signal and a general arithmetic circuit output data enable signal, and receiving a dedicated arithmetic circuit output data enable signal;
    a first address generator for continuously outputting M first addresses on the basis of the first start signal from the program control circuit;
    a first data memory for outputting M pieces of first data on the basis of the first addresses from the first address generator;
    a first pipeline operation circuit for executing, a pipeline operation for the first data from the first data memory and successively outputting M first operation results, in accordance with the first operation circuit selection signal from the program control circuit;

a second pipeline operation circuit for executing a pipeline operation for second operation results from the dedicated arithmetic circuit and successively outputting M third operation results, in accordance with the second operation circuit selection signal from the program control circuit;

a second address generator for continuously outputting M second addresses on the basis of the second start signal from the program control circuit; and a second data memory containing the M third operation results from the second pipeline operation circuit on the basis of the second addresses from the second address generator, and said dedicated arithmetic circuit comprises:

N dedicated pipeline operation circuits each outputting signal notifying a number of pipeline stages, and executing a pipeline operation for the first operation results from the first pipeline operation circuit in the general arithmetic circuit;

a data selection circuit for selecting n-th dedicated operation results from dedicated operation results which are respectively output by the N dedicated pipeline operation circuits, in accordance with the dedicated pipeline operation circuit selection signal from the program control circuit in the general arithmetic circuit, and outputting the n-th dedicated operation results to the second pipeline operation circuit in the general arithmetic circuit as the second operation results; and a control circuit for receiving the signals each notifying the number of pipeline stages, each of which signals is output by each of the plural dedicated pipeline operation circuits, and the dedicated pipeline operation circuit selection signal and the general arithmetic circuit output data enable signal from the program control circuit in the general arithmetic circuit, and outputting the dedicated arithmetic circuit output data enable signal to the program control circuit in the general arithmetic circuit.

3. The arithmetic unit of claim 2 wherein said first pipeline operation circuit in the general arithmetic circuit comprises:

a first register for receiving the first data from the first data memory and outputting second data, on the basis of the first operation circuit selection signal from the program control circuit;

a second register for outputting third data which are previously stored;

a multiplier for receiving the second data from the first register and the third data from the second register, and outputting a result obtained by multiplying the second and third data as fourth data;

a third register for receiving the fourth data from the multiplier, and outputting fifth data;

a fourth register for outputting sixth data which are previously stored;

an arithmetic operation unit for receiving the fifth data from the third register and the sixth data from the fourth register, and outputting a result of arithmetic of the fifth and sixth data as seventh data; and a fifth register for receiving the seventh data from the arithmetic operation unit, and outputting the first operation results as outputs of the first pipeline operation circuit, said second pipeline operation circuit in the general arithmetic circuit comprises: a sixth register for receiving the second operation results from the dedicated arithmetic circuit and outputting the third operation results as output of the second pipeline operation circuit, on the basis of the second operation circuit selection signal from the program control circuit, and specific one of the dedicated pipeline operation circuits in the dedicated arithmetic circuit comprises: an IDCT (Inversion Discrete Cosine Transform) operation unit for receiving the first operation results from the first pipeline operation circuit, subjecting the results to one-dimensional inversion discrete cosine transform, and outputting the dedicated operation results as output of the dedicated pipeline operation circuit.

4. The arithmetic unit of claim 3 wherein said arithmetic operation unit comprises:

an adder for receiving a first input and a second input, and outputting a result which is obtained by adding the first and second inputs;

a subtracter for receiving the first input and the second input, and outputting a result which is obtained by subtracting the second input from the first input; and an output selector for receiving the addition result of the adder, the subtraction result of the subtracter and "0", and outputting data which are selected from the addition result, the subtraction result and "0", the output selector selecting and outputting the addition result of the adder when the first input is a positive number, selecting and outputting "0" when the first input is "0", and selecting and outputting the subtraction result of the subtracter in other cases.

5. The arithmetic unit of claim 2 wherein said first pipeline operation circuit in the general arithmetic circuit comprises: a first register for receiving the first data from the first data memory and outputting the first operation results as outputs of the first pipeline operation circuit, on the basis of the first operation circuit selection signal from the program control circuit, said second pipeline operation circuit in the general arithmetic circuit comprises:

a second register for receiving the second operation results from the dedicated arithmetic circuit and outputting second data, on the basis of the second operation circuit selection signal from the program control circuit;

a third register for outputting third data which are previously stored;

an arithmetic operation unit for receiving the second data from the second register and the third data from the third register, and outputting, a result of arithmetic of the second and third data as fourth data;

a fourth register for receiving the forth data from the arithmetic operation unit and outputting fifth data;

a fifth register for outputting sixth data which are previously stored;

a multiplier for receiving the fifth data from the fourth register and the sixth data from the fifth register, and outputting a result which is obtained by multiplying the fifth and sixth data as seventh data; and a sixth register for receiving the seventh data from the multiplier, and outputting the third operation results as outputs of the second pipeline operation circuit, and specific one of the dedicated pipeline operation circuits in the dedicated arithmetic circuit comprises: a DCT (Discrete Cosine Transform) operation unit for receiving the first operation results from the first pipeline operation circuit in the general arithmetic circuit, subjecting the results to one-dimensional discrete cosine transform, and outputting the second dedicated operation results as outputs of the dedicated pipeline operation circuit.

6. The arithmetic unit of claim 5 wherein said arithmetic operation unit comprises:
- an adder for receiving a first input and a second input, and outputting a result which is obtained by adding the first and second inputs;
- a subtracter for receiving the first input and the second input, and outputting a result which is obtained by subtracting the second input from the first input; and
- an output selector for receiving the addition result of the adder, the subtraction result of the subtracter and "0", and outputting data which are selected from the addition result, the subtraction result and "0", the output selector selecting and outputting the addition result of the adder when the first input is a positive number, selecting and outputting "0" when the first input is "0", and selecting and outputting the subtraction result of the subtracter in other cases.

7. An image processing apparatus which mounts two of the arithmetic units of claim 2, the arithmetic units being a first arithmetic unit and a second arithmetic unit, said image processing apparatus comprising:
- said first arithmetic unit having a DCT operation circuit for receiving the first operation results, subjecting the first operation results to one-dimensional discrete cosine transform, and outputting first dedicated operation results, as a first dedicated pipeline operation circuit, and an IDCT operation circuit for receiving the first operation results, subjecting the first operation results to one-dimensional inversion discrete cosine transform, and outputting second dedicated operation results, as a second dedicated pipeline operation circuit;
- said second arithmetic unit having a half-pel operation circuit for receiving the first operation results, subjecting the first operation results to a half-pel operation, and outputting first dedicated operation results, as a first dedicated pipeline operation circuit, and a post-noise reduction filter operation circuit for receiving the first operation results, subjecting the first operation results to a post-noise reduction filter, and outputting second dedicated operation results, as a second dedicated pipeline operation circuit;
- a host interface for sending/receiving data to/from a host microcomputer;
- a video interface for receiving image data from an image A/D converter, subjecting the image data to pre-scaling and outputting CIF (Common Internet File) data or QCIF (Quadrature Common Internet File) data, and receiving CIF data or QCIF data, subjecting the CIF data or QCIF data to post-scaling and outputting the data to an image D/A converter;
- a DMA (Direct Memory Access) control circuit for controlling input/output of data from the host microcomputer via the host interface, input/output of data from a first data memory or a second data memory in the first arithmetic unit, input/output of data from a first data memory or a second data memory in the second arithmetic unit, and input/output of the CIF data or QCIF data from the video interface, to/from a bulk memory; and
- a common memory having a function of transferring data between the first arithmetic unit and the second arithmetic unit.

* * * * *